235-379 SR
8/4/81 OR 4,282,424

United States Patent [19]

[11] 4,282,424
[45] Aug. 4, 1981

Hirose

[54] AUTOMATIC CASH DISPENSING MACHINE

[75] Inventor: Minoru Hirose, Yokohama, Japan
[73] Assignee: Tokyo Shibaura Denki Kabushiki Kaisha, Kawasaki, Japan

[21] Appl. No.: 118,852
[22] Filed: Feb. 5, 1980
[30] Foreign Application Priority Data
Mar. 28, 1979 [JP] Japan ........ 54-36733
[51] Int. Cl.³ ........ G06F 15/30; G06F 7/08
[52] U.S. Cl. ........ 235/379; 235/381
[58] Field of Search ........ 235/379, 381; 340/149 A

[56] References Cited

U.S. PATENT DOCUMENTS

| | | | |
|---|---|---|---|
| 3,760,158 | 9/1973 | Whitehead et al. | 235/379 |
| 3,862,716 | 1/1975 | Black et al. | 235/381 |
| 3,937,925 | 2/1976 | Boothroyd | 235/379 |
| 4,109,238 | 8/1978 | Creekmore | 235/379 |

FOREIGN PATENT DOCUMENTS 51-14239 2/1976 Japan .

*Primary Examiner*—Daryl W. Cook
*Attorney, Agent, or Firm*—Cushman, Darby & Cushman

[57] ABSTRACT

Disclosed is an automatic cash dispensing machine whose casing has a substantially vertical front panel and a substantially horizontal top panel extending backward from the top edge of the front panel. On the horizontal top panel are a keyboard operation unit through which a customer is to designate an amount of money to be paid and a guide display unit for displaying instructions for the operations on the operation unit. On the vertical front panel are an identification card inlet and a cash outlet. This dispensing machine is formed of two types of consoles; a plurality of upper consoles may be electrically connected with a common lower console, in a mode of arrangement.

6 Claims, 15 Drawing Figures

FIG. 1
PRIOR ART
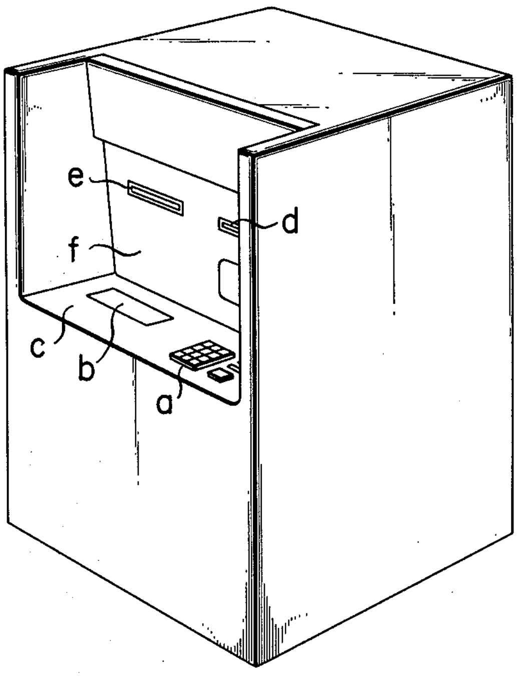
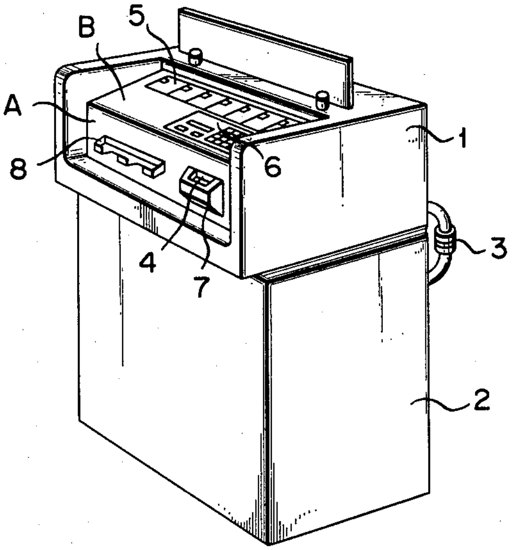
FIG. 2

AUTOMATIC CASH DISPENSING MACHINE

BACKGROUND OF THE INVENTION

This invention relates to an automatic cash dispensing machine capable of automatically issuing an amount of money which a customer designates by means of an identification medium, such as an identification card (hereinafter referred to as the ID card).

Cash dispensing machines of this type, which have rapidly come into wide use for the rationalization of service at tellers' windows, generally have such construction as shown in FIG. 1, by way of example, and may be disposed in the doorways of banks or embedded in walls with only the panels for customers' operations exposed from the wall surface.

In any case, the dispensing machines of such conventional type, handling a large amount of money, resemble real property in specifications—oversized and heavy or of embedded-in-the-wall type for the prevention of thefts. As regards the panels for customers' operations, moreover, most of the prior art dispensing machines are so constructed that a keyboard a for the designation of an amount to be paid and a guide display unit b for the operating instructions are arranged on a substantially horizontal panel c, and that an inlet d for identification medium such as ID cards and an outlet e for cash and receipt slips are formed in a substantially vertical panel f rising on the rear edge of the horizontal panel c. That is, the customer-operation panels c and f are apparently recessed. Thus, the depth of the region of the panels is limited, so that the internal mechanisms are dispersed in the upper or lower space inside the dispensing machine. Accordingly, the machine body cannot help being tall.

Undoubtedly, the bulkiness and heaviness have so far been regarded as requisites to the machine body from a point of view of crime prevention, and presented no problems.

Recently, however, compactness and lightness have come to be required of these automatic cash dispensing machines. This can be attributed to a demand for such a mode of application that a plurality of cash dispensing machines are mounted on a service counter of a bank over which a clerk in charge may observe how the machines are operated, for the rationalization of payment service at the teller's window of the bank, for example. Otherwise, such compact and light machines may be needed for the economy of space because of the limited setting spaces in and outside the bank building.

SUMMARY OF THE INVENTION

The object of this invention is to provide an automatic cash dispensing machine having various advantages including compactness, light weight, reduced setting space, ease of carrying and relocation, and unchanged facility for customers' operations as compared with the prior art machines.

In order to attain the above object, there is provided an automatic cash dispensing machine of the following basic arrangement. Like the prior art dispensing machines, a keyboard operation unit for the designation of an amount to be paid and a guide display unit for the operations thereon are arranged on a substantially horizontal panel, while an inlet for identification medium and outlets for cash and receipt slips are formed in a substantially vertical panel. This is done because such dispersive arrangements on the two horizontal and vertical panels or surfaces are desirable in view of the efficiency and convenience of the customers' operations.

According to this invention, however, the horizontal panel extends backward from the top edge of the vertical panel located in front thereof, thereby coming into line with the top face of the machine body, unlike the recessed configuration of the control panels of the prior art machines. Moreover, several internal mechanisms associated with the operation unit, guide display unit, inlet and outlets that appear on the surface are designed for suitable distribution to provide the compact and light automatic cash dispensing machine.

BRIEF DESCRIPTION OF THE DRAWINGS

FIG. 1 is a perspective view showing an example of a prior art automatic cash dispensing machine.

FIG. 2 is a perspective exterior view of an automatic cash dispensing machine in a stacked configuration according to this invention, which is given in the same reduced scale of the prior art dispensing machine of FIG. 1.

Figure 3:
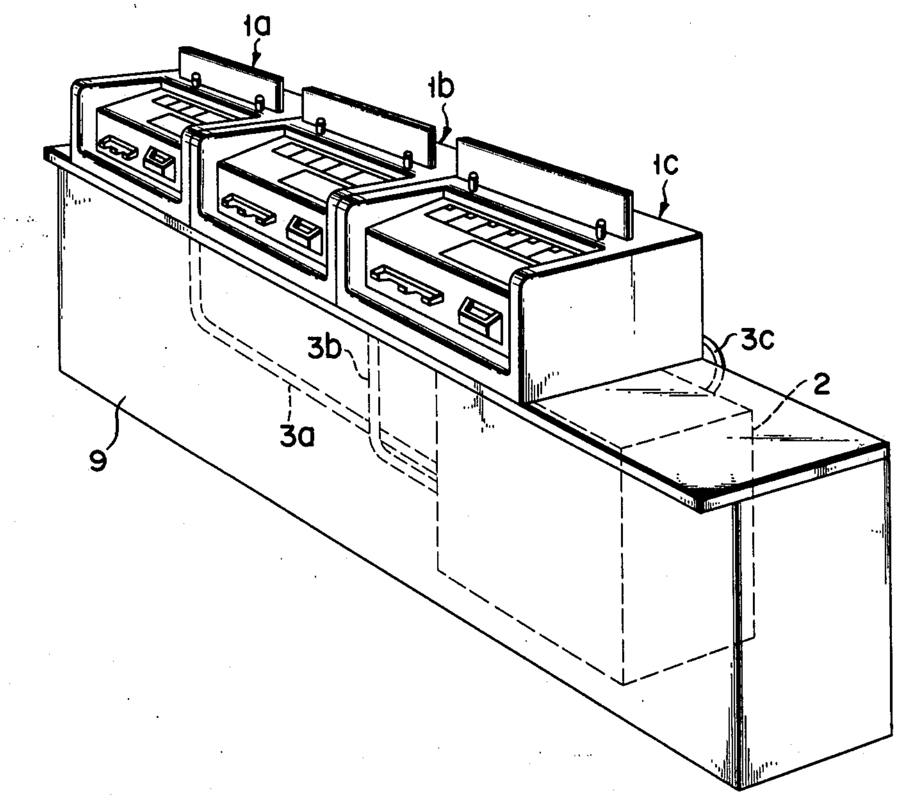
FIG. 3 is a perspective exterior view showing how a plurality of mechanical sections or upper consoles of the automatic cash dispensing machine of the invention as shown in FIG. 2 are arranged on a service counter of a bank under which an electric control section or lower console is disposed.

Now there will be described in detail an automatic cash dispensing machine according to an embodiment of this invention with reference to the accompanying drawings of FIGS. 2 to 15.

DETAILED DESCRIPTION OF THE PREFERRED EMBODIMENT

Referring now to the drawing of FIG. 2 illustrating the automatic cash dispensing machine in a stacked configuration of this invention, there are shown a console-type mechanical section 1 for the direct handling of medium including ID cards, bank notes, receipt slips, etc., an electric control section 2 containing a control power source and the like for controlling the mechanical section 1 and constituting another console, and a cable 3 for electrically connecting the mechanical section with the electric control section.

In performing a transaction through the automatic cash dispensing machine according to this invention, a customer inserts his ID card into a card inlet/outlet 4, operates a keyboard 6 in accordance with instructions displayed on an operation guide display 5, thereby performing operations including inputting of code number and amount and checking, and finally receives a receipt slip, the card and bank notes from a slip output 7, the card inlet/outlet 4 and a cash outlet 8, respectively.

As may be seen from FIG. 2, the ID card inlet/outlet 4, slip outlet 7 and cash outlet 8 are disposed on a substantially vertical front surface A. The operation unit 6 and the display 5 are disposed on a substantially horizontal top surface B which is somewhat inclined, extending backward from the top edge of the vertical front surface A. Unlike the panel surfaces c and f as shown in FIG. 1, therefore, the control panel surfaces A and B of the dispensing machine of FIG. 2 form a convexity. Thus, in spite of the compactness of the machine body, the machine can provide a wide internal space. Moreover, the proper arrangement of the operative functions on the surfaces A and B enables the customer to perform the operations for the transaction with ease.

FIG. 3 shows an example of a setting in which a plurality of mechanical sections 1*a*, 1*b* and 1*c* are placed in parallel with one another on, for example, a service counter in a bank lobby and the electric control section 2 for common use is singly disposed under the counter. In this case, the common-use electric control section 2 controls the three mechanical sections 1*a*, 1*b* and 1*c*. Since the machine may thus be separated into the upper and lower consoles, the weight of the machine can be split and the lightweight sections can be packed up individually. Thus, these sections of the machine can be packed in cheap corrugated cardboard boxes, and carried easily due to their light weight. Further, although placed on the service counter, the mechanical sections are relatively short, so that a clerk in charge can watch customers drawing out their money over the counter. Moreover, these upper and lower consoles can be arranged horizontally or piled up according to the location.

Now there will be described in detail the construction and function of the automatic cash dispensing machine according to an embodiment of this invention as externally shown in FIG. 3.

Figure 4:
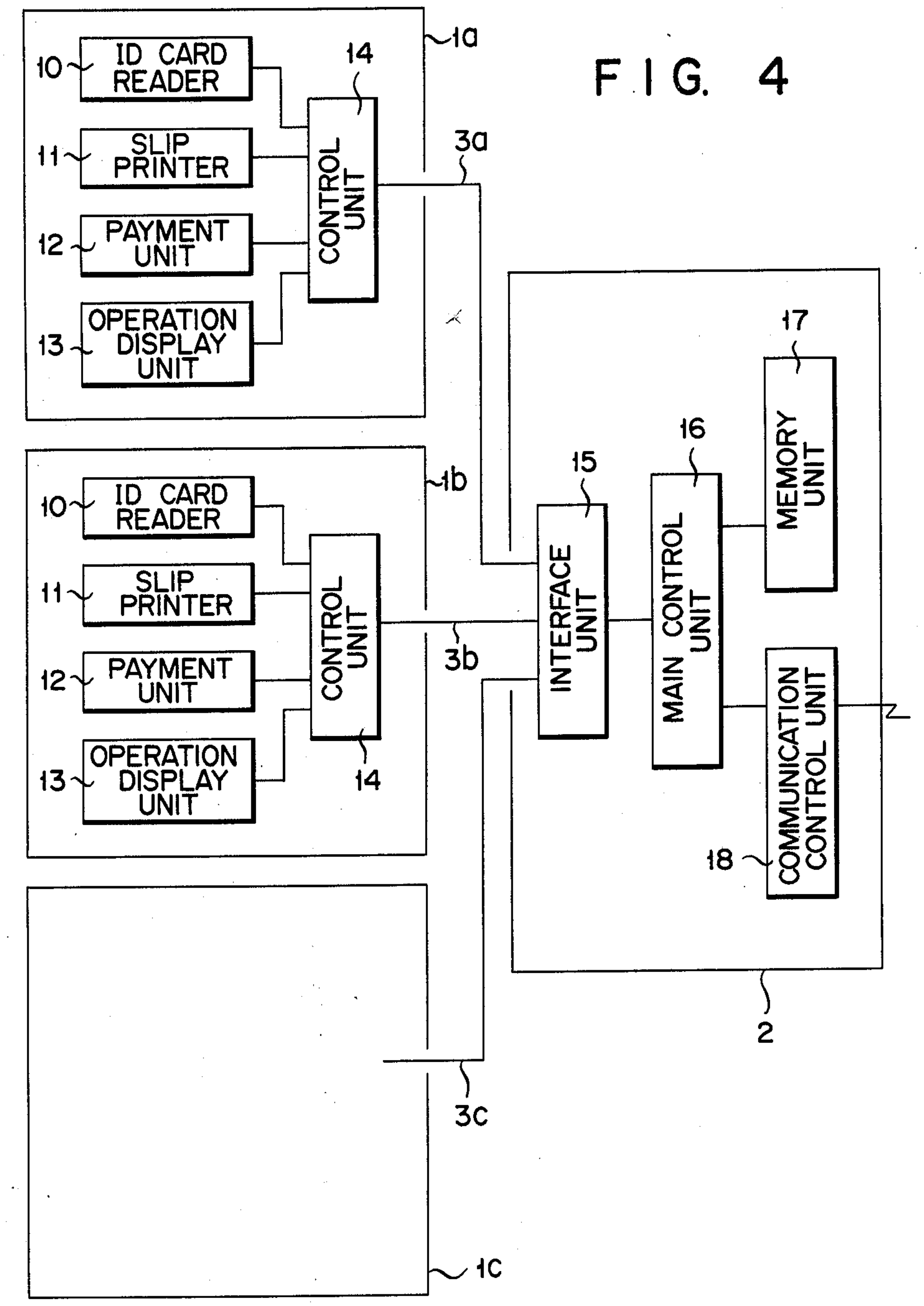
FIG. 4 is a block diagram showing control systems inside the automatic cash dispensing machine of the invention.

FIG. 4 is a block diagram of the automatic dispensing machine which is so constructed that the three mechanical sections 1*a*, 1*b* and 1*c* are controlled by the single electrical control section 2. These mechanical sections each contain therein several units including an ID card reader 10 to receive and read the ID card to verify the identity of the customer, a slip printer 11 to issue a slip bearing transaction details, a payment unit 12 to deliver cash, and an operation display unit 13 to operate the guide display 5, and a control unit 14 to control these units.

The mechanical sections 1*a*, 1*b* and 1*c*, which are of the same construction, are connected to the electric control section 2 by means of cables 3*a*, 3*b* and 3*c*, respectively. The electric control section 2 is so constructed as to be able to manage the mechanical sections 1*a*, 1*b* and 1*c* in parallel with one another. Further, there are shown an interface unit 15 to function as a connecting member for the reception and transmission of data from and to the mechanical sections 1*a*, 1*b* and 1*c*, a main control unit 16 to process the data transmitted from the mechanical sections 1*a*, 1*b* and 1*c* by means of the cables 3*a*, 3*b* and 3*c*, a memory unit 17 to store transaction data such as the amount paid, account number, etc., and a communication control unit 18 including a modem for on-line communication with a host computer.

Moreover, a power supply unit (not shown) to supply those units with electric power is disposed inside the electric control section 2.

Now there will be described the function or operation of the automatic cash dispensing machine of the above-mentioned construction.

The customer is allowed to select at his option one out of the mechanical sections 1*a*, 1*b* and 1*c* of the cash dispensing machine placed on the service counter. Here let it be supposed that he chooses the mechanical section 1*c* for his transaction, as shown in the example of FIG. 3. The customer inserts his ID card into the card inlet 4. The ID card put in through the card inlet 4 is read by the ID card reader 10. Then, the customer inputs his code number that he memorizes by operating the keyboard 6. Informations from the card reader 10 and the keyboard 6 are sent to the main control unit 16 via the control unit 14, cable 3*c*, and the interface unit 15. At the main control unit 16, the code data stored in the memory unit 17 is read out in response to the information from the keyboard 6 which is regarded as an address, and compared with the data from the card reader 10. If the comparison verifies the identity of the inserted ID card, then the next step is entered. The customer is informed of such transition from one step to another as an operating procedure by the operation guide display 5. As mentioned before, the operation guide display 5 is driven by the operation display unit 13 under the control of the control unit 14. In the operation guide display 5 are display boards arranged in two lines and bearing printed letters for guidance or instructions such as "INSERT YOUR CARD", "KEY IN YOUR NUMBER", etc. as shown in the enlarged view of FIG. 15. Beside each individual notice is a lamp, which is to be selectively lighted, thereby giving the customer an instruction for the operation in accordance with the illuminated notice. These operations will be described later in details.

Thereupon, the customer inputs an amount of money he wants to be paid by means of the keyboard 6. Data on the amount to be paid is transmitted to the main control unit 16 via the control unit 14, cable 3*c* and interface unit 15. Then, the amount data is delivered, together with the data including the account number read from the ID card, to the host computer (not shown) through the communication control unit 18. In the host computer, the balance in the account concerned is collated with the ledger. Unless the desired amount inputted through the keyboard 6 exceeds the balance in the account, the customer is allowed to perform a transaction, a signal to that effect is applied to the electric control section 2 through the communication control unit 18, and the balance is renewed at the host computer side.

Then, the control unit 14 actuates the payment unit 12 in response to the transaction permission signal from the host computer, thereby causing the specified amount of money to be discharged from the cash outlet 8. At the same time, details of the transaction are printed on a slip by the slip printer 11, and the slip is delivered from the slip outlet 1.

Thus, a series of operations for a transaction are completed, and the machine is restored to its initial state.

Referring now to the drawings of FIGS. 5 to 13, there will be described the structure inside the casing of the mechanical section.

Figure 5:
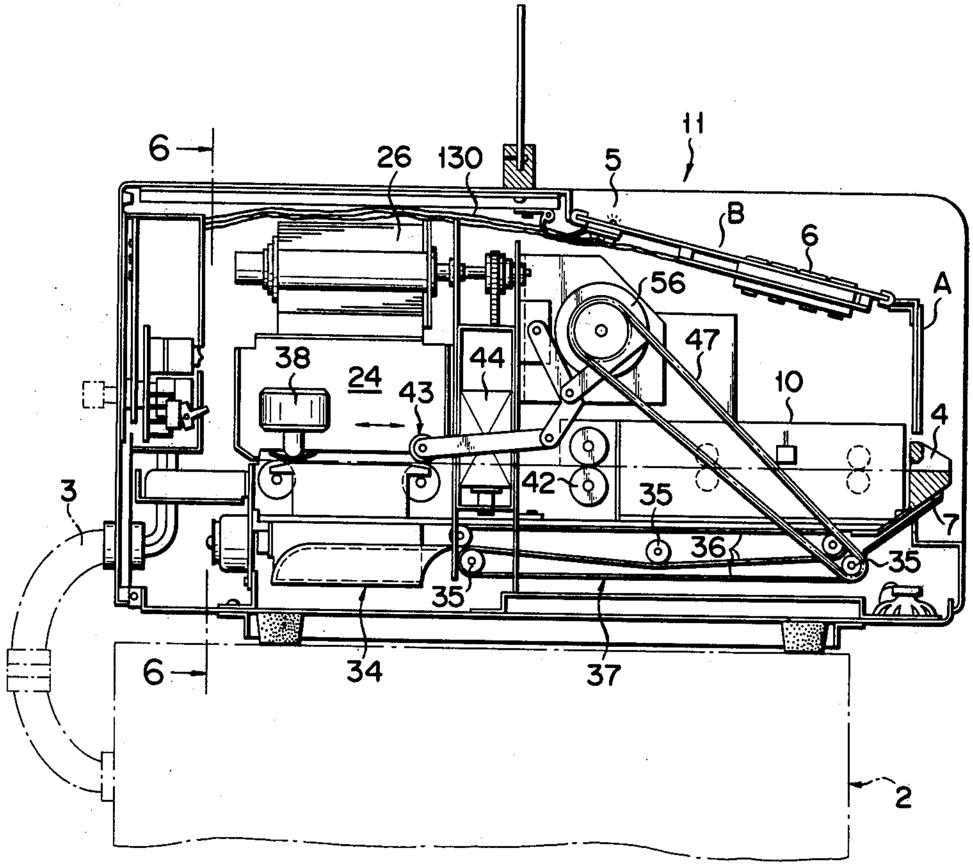
FIG. 5 is a sectional view of mechanical parts of an ID card reader and a slip printer.
Figure 6:
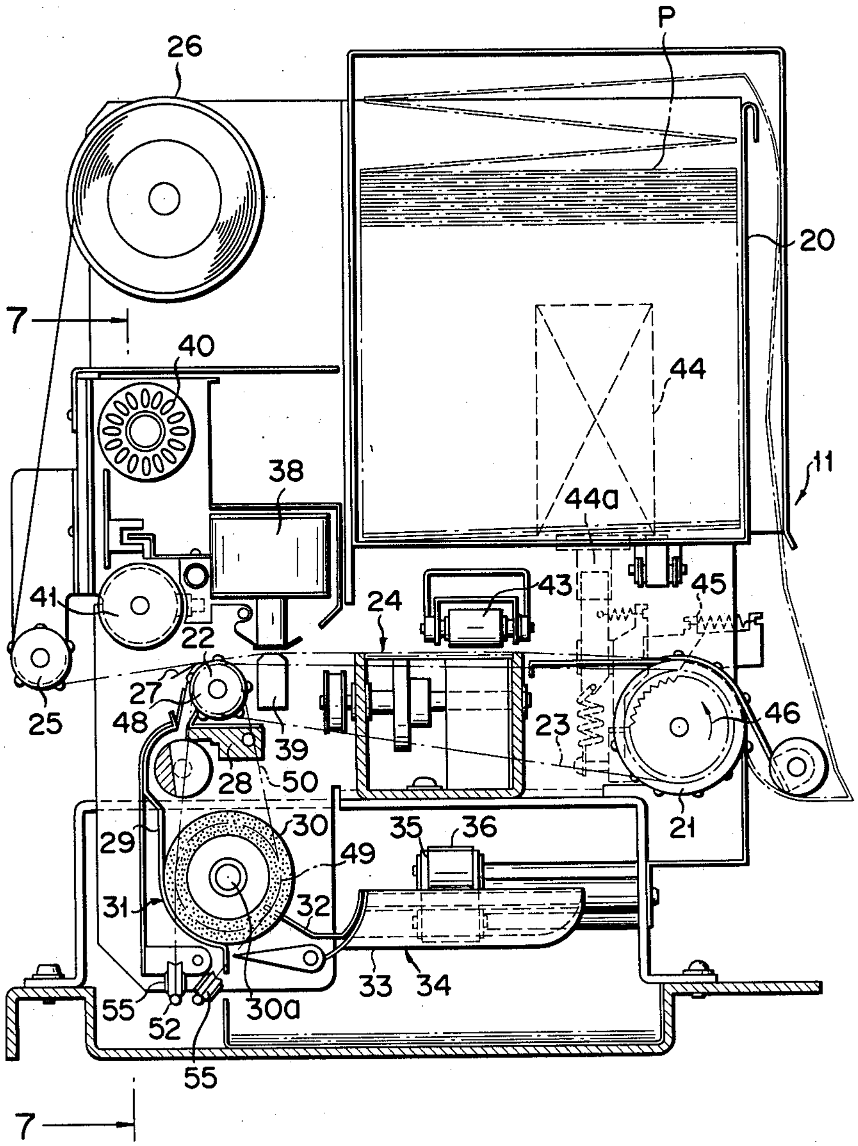
FIG. 6 is an enlarged sectional view of the slip printer as taken along line 6—6 of FIG. 5.
Figure 7:
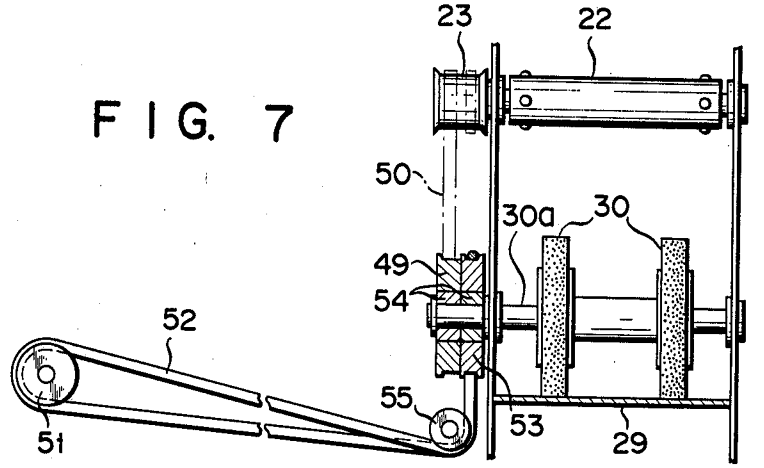
FIG. 7 is a sectional view of the principal mechanism as taken along line 7—7 of FIG. 6.
Figure 8:
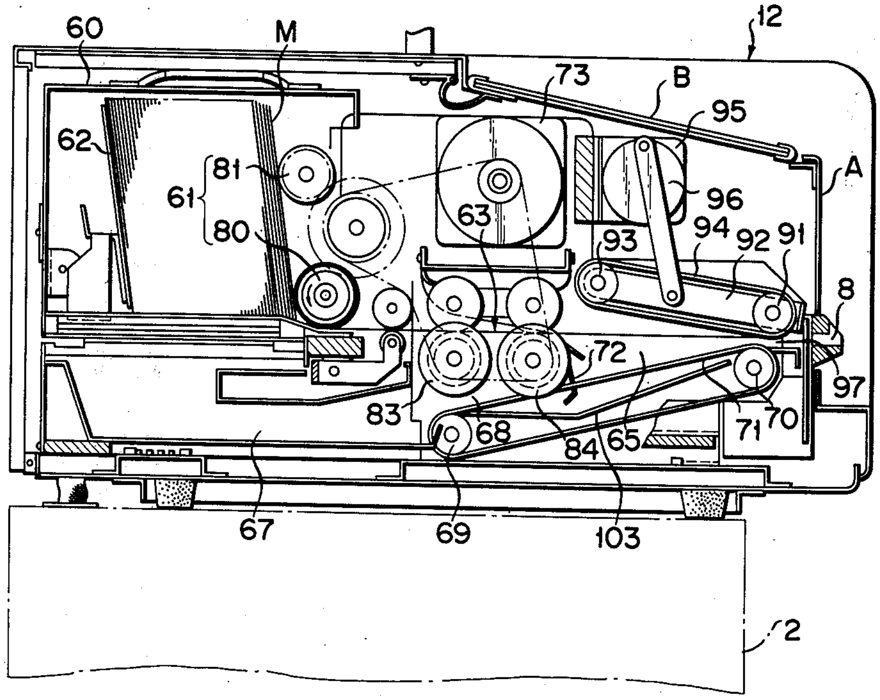
FIGS. 8 and 9 and 11 to 13 are sectional views of mechanical parts of a payment unit in various operating states.

FIG. 5 shows the relationship between the ID card reader 10, slip printer 11 and operation display unit 13 set in the mechanical section 1 as an upper console, while FIG. 6 is a partially sectional view of a slip issuing mechanism as taken along line 6—6 of FIG. 5, and FIG. 7 shows the principal part of the slip issuing mechanism. Referring first to FIGS. 5 to 7, there will be described the ways of handling the ID card and issuing the slip.

Numeral 20 of FIG. 6 designates a storage box in the slip issuing apparatus, in which elongated two-ply pressure-sensitive duplicating paper (P) is stored. The duplicating paper (P) is drawn out and carried by means of a first path composed of a first sprocket 21, a second sprocket 22 and a timing belt 23, and the upper sheet of the duplicating paper (P) is passed round the third sprocket 25 and wound as a duplicate journal by a take-up mechanism 26. The lower sheet of the paper (P) is separated from the upper sheet by a separating plate 27 disposed in the vicinity of the second sprocket 22, guided downward, and then passed through a cutter mechanism 28 arranged below the sprocket 22. Thereafter, the lower sheet is passed through a second path 31 composed of a guide plate 29 and sponge-rubber rollers 30, and a slip with a predetermined length is cut from the lower sheet by the cutter mechanism 28. Then, the slip is forced out by the sponge-rubber rollers 30, and twisted by a twist member 34 consisting of inside and outside guide plates 32 and 33. That is, the slip is turned over, shifting its course through an angle of approximately 90°. Thereafter, the slip is discharged from the slip outlet 7 in the vertical front surface of the dispensing machine through a third path 37 composed of rollers 35 and endless belts 36, as shown in FIG. 5.

A printing head 38, platen 39, printing head driving motor 40, and a printing head lead screw 41 all lie in the first path 24. Generally, in an automatic cash dispensing machine, embossment in the ID card is transferred to corresponding slip and duplicate journal. Inserted through the ID card inlet/outlet 4 in the vertical front surface of the dispensing machine, the ID card is carried by means of a plurality of rollers 42, and set for transcription by means of an embossing printer 43 when it reaches a position right under the first path 24.

The first path 24 is so designed that the first sprocket 21 is rotated intermittently in the direction of an arrow 46 at low speed by a ratchet mechanism 45 which converts an alternating motion or reciprocation of a plunger 44*a* accompanying the operation of a plunger-type solenoid 44 into an intermittent rotatory motion, thereby intermittently carrying the duplicating paper (P) to the left of FIG. 6. The third path 37 is so designed that the rollers 35 are driven at high speed by a motor 56 through a driving chain 47, as shown in FIG. 5. As for the second path 31, it is driven by a timing belt 50 coupling a timing pulley 48 beside the second sprocket 22 with a timing pulley 49 beside a shaft 30*a* of the sponge-rubber rollers 30. Further, as shown in FIG. 7, the second path 31 is driven by a round belt 52 passed round a driving pulley 51 and a round-belt pulley 53 mounted on the shaft 30*a* of the sponge-rubber rollers 30. Between the shaft 30*a* of the sponge-rubber rollers 30 and the timing pulley 49 and round-belt pulley 53 mounted on the shaft 30*a* are one-way clutches 54 constituting a conveying speed changing mechanism. The one-way clutches 54 tend to transmit driving force only in one direction. Therefore, if two turning efforts or driving forces of the first and third paths 24 and 37 are applied in the same direction, only greater one of them, i.e. the driving force of the third path 31, will be transmitted to the sponge-rubber rollers 30. Numeral 55 of FIG. 7 designates one of paired guide rollers for the round belt 52.

When the ID card is inserted in the ID card inlet/outlet 4, it is carried by the upper and lower rollers 42, and the embossment in the ID card is transferred to the duplicating paper (P) by the embossing printer 43 when the ID card reaches the position right under the first path 24. Thereafter, the duplicating paper (P) is fed to be located under the printing head 38 and printed. Then, the upper sheet of the duplicating paper (P) is wound by the take-up mechanism 26 through the third sprocket 25. On the other hand, the lower sheet is fed to the cutter mechanism 28, where the slip with the predetermined length is cut from the sheet, forced out by the sponge-rubber rollers 30 of the second path 31, twisted by the twist member 34, and then carried through the third path 37 to the slip outlet 7. In printing the slip, the conveying speed of the first path 24 is lower than that of the third path 37. As described before, however, the one-way clutches 54 are mounted on the shaft 30*a* of the sponge-rubber rollers 30, so that the conveying speed of the second path 31 may be adjusted to the speed of intermittent conveyance of the first path 24 and the high discharge speed of the third path 37.

The above-mentioned slip printer 11 is made compact and light by arranging the slip path horizontally right under the ID card path and forming the slip outlet 7 in the vertical front surface A of the dispensing machine.

Referring now to the drawings of FIGS. 8 to 13, there will be described in detail the payment unit 12 in the mechanical section 1.

Figure 9:
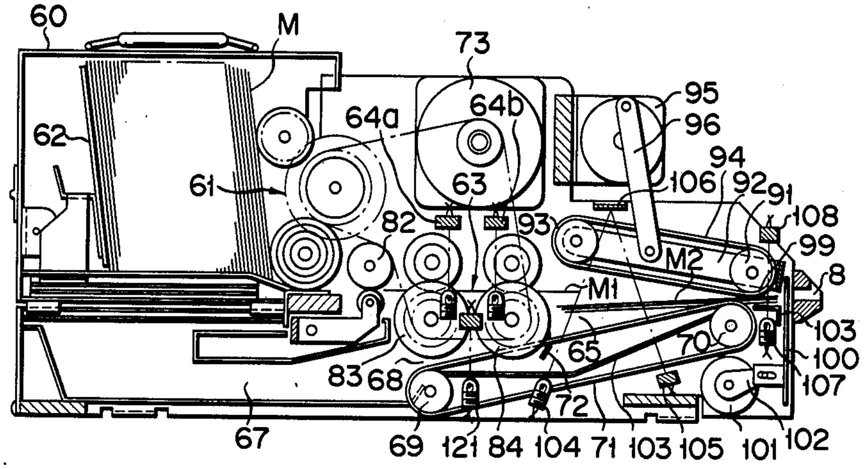

Numeral 60 designates a bank note container, e.g. a safe. The safe 60 is removably attached to the payment unit 12. A number of bank notes (M) for payment are previously stored in the safe 60. These notes (M) in the safe 60 are pressed against a takeout mechanism 61 by a spring (not shown) through a backup plate 62. The takeout mechanism 61 includes a takeout roller 80 and a cam roller 81 as mentioned later. As the rollers of the takeout mechanism 61 rotate in the arrowed direction, the notes (M) in the safe 60 are taken out one by one. The notes from the safe 60 are fed into a conveyor system 63 which is arranged horizontally, following the takeout mechanism 61. In the middle of the conveyor system 63 are optical counters 64*a* and 64*b* spaced from each other, as shown in FIG. 9, for example. The terminal portion of the conveyor system 63 forms a note entrance to a temporary collecting section 65. The temporary collecting section 65 is located in a position a little lower than the position of the conveyor system 63, and a recovery box 67 is disposed below the safe 60 and the conveyor system 63, bestriding the boundary between them. A recovery opening 68 is defined on the side of the recovery box 67 facing the temporary collecting section 65, and a recovery-side roller 69 is disposed at the recovery opening 68. Further, a discharge-side roller 70 is disposed in close vicinity to the cash outlet 8 on the vertical front surface A of the casing of the payment unit or the mechanical section 1. An elastic endless belt 71 (hereinafter referred to as the lower belt) is stretched between the recovery- and discharge-side rollers 69 and 70. A bank note ($M_1$) carried into the temporary collecting section 65 is received by the top-side belt portion of the lower belt 71, and a plurality of such notes are successively stacked to be temporarily collected on the upper belt portion. A stopper 72 for the prevention of wrong conveyance hangs to cross the upper belt portion of the lower belt 71. The function of the stopper 72 is to prevent notes ($M_2$) being temporarily collected on the upper belt portion from entering the recovery opening 68 by mistake.

A main motor 73, which is located over the conveyer system 63, supplies several mechanisms with driving force, as described below. A sprocket 74 fixed on the motor shaft and a sprocket 76 on one end of a counter shaft 75 are coupled by means of an endless chain 77, and a coaxial gear 79 is coupled with the sprocket 76 through a clutch 78, engaging the takeout roller 80 and cam roller 81. Thus, the rollers 80 and 81 constituting the takeout mechanism 61 are rotated by the main motor 73 through the series of transmission mechanisms. The cam roller 81, which tends to give an incentive to a close accumulation or stack of bank notes (M) for the ease of takeout, is so designed as to rotate somewhat eccentrically.

The chain 77 is passed round sprockets 82*a*, 83*a* and 84*a*. A first driving roller 82, a spool-shaped second driving roller 83, and a spool-shaped third driving roller 84 are rotated in concert with these sprockets. Namely, the conveyer system 63 consisting of the driving rollers 82, 83 and 84 is also driven by the main motor 73.

A sprocket 84*b* on one end of the shaft of the third driving roller 84 is coupled to a sprocket 86 by means of an endless chain 87, while the sprocket 86 is coupled to the discharge-side roller 70 through a clutch 85.

A gear 89 mounted on one end of the shaft of the second driving roller 83 through a clutch 88 engages a gear 90. The gear 90 rotates coaxially with the recovery-side roller 69.

A fourth roller 91 is arranged above and in close vicinity to the discharge-side roller 70. On the shaft of the roller 91 is a swing member 92 which swings up and down around the shaft. The free end of the member 92 extends backward to hang over the temporary collecting section 65. Further, the extended free end of the member 92 is located above the entrance to the temporary collecting section 65.

A fifth roller 93 is pivotally mounted on the free end of the swing member 92, and an endless belt 94 (hereinafter referred to as the upper belt) is stretched between the roller 93 and the fourth roller 91. The member 92 is coupled to a motor 95 disposed above it by means of a crank mechanism 96. Accordingly, the rotatory motion of the motor 95 is converted into a vertical motion, which is transmitted to the swing member 92. Thus, the member 92 swings vertically around the shaft of the fourth roller 91. Hereupon, the lower and upper belts 71 and 94 constitute a mechanism to hold the stack of bank notes ($M_2$) collected in the temporary collecting section 65 as they are and to lead them en bloc to the cash outlet 8. On the respective shafts of the discharge-side or outlet-side roller 70 and the fourth roller 91 are a pair of gears 97 and 98 fixed to their corresponding shafts and engaging each other. By these gears 97 and 98, the turning effort transmitted from the driving motor 73 to the clutch 85 for discharge by means of the chains 77 and 87 is transmitted to the fourth roller 91, thereby operating the upper belt 94.

A space 99 between the discharge-side roller 70 and the fourth roller 91 is always wide enough to pass easily the maximum amount of notes ($M_2$) collected in the temporary collecting section 65. The space 99 is in close vicinity to the cash outlet 8 of the casing 1, a platelike shutter 100 being interposed between them. The platelike shutter 100 is so designed as to be slided vertically by a combined action of a rotary solenoid 101 and an arm 102 arranged below. The shutter 100 is lowered to connect the outlet 8 with the space 99 and is raised to disconnect said outlet 8 therefrom. Further, numeral 103 denotes a guide member which tends to guide bank notes ($M_3$) to be discharged toward the outlet 8.

At the temporary collecting section 65 is an optical detector consisting of a light source 104 and a sensing element 105. The function of this detector is to detect the existence of collected notes at the temporary collecting section 65. Light from the light source 104 is reflected by a mirror 106 and received by the sensing member 105, so that the detection may cover a wide range of the temporary collecting section 65. Also, between the space 99 and the platelike shutter 100 is another optical detector composed of a light source 107 and a sensing element 108. The function of this detector is to detect the discharge of the notes from the space 99.

Meanwhile, the bank notes ($M_2$) collected at the temporary collecting section 65 are lightly pressed from above by a leaf spring (not shown) so as to be prevented from striking heavily against the platelike shutter 100.

Now there will be described the operation of the above-mentioned construction. When a payment operation is started, for example, the bank notes (M) in the safe 60 are taken out one by one by the takeout mechanism 61, and the notes taken out of the safe 60 are carried toward the temporary collecting section 65 by the conveyor system 63. The carried notes are detected and counted the counters 64*a* and 64*b*, and then stacked and collected successively at the temporary collecting section 65. At this time, the forward edges of the stacked notes ($M_2$) are trued up since the notes ($M_2$) are stopped where they hit softly against the platelike shutter 100 in the front.

Figure 11:
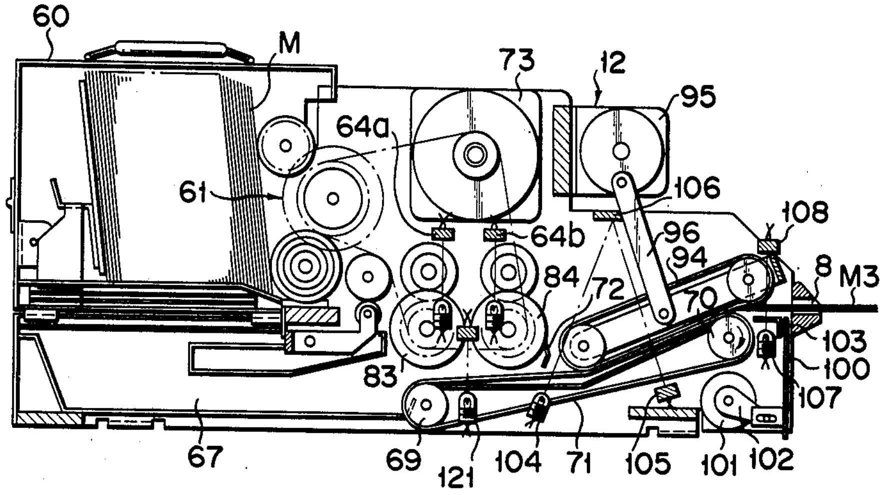

The swing member 92 is forced down round the shaft of the fourth roller 4, as shown in FIG. 11, by the combined action of the motor 95 and the crank mechanism 96. Thus, the stack of bank notes ($M_2$) collected in the aforesaid manner will be held between the lower and upper belts 71 and 94 unless subjected to malfunctions of the takeout mechanism 61 such as multiple takeout or wrong operations of the counters 64*a* and 64*b* such as counting errors. At the same time, the platelike shutter 100 is lowered by the combined action of the rotary solenoid 101 and the arm 102 to connect the outlet 8 with the space 99, and then the main driving motor 73 is operated to rotate the discharge-side roller 70 in the arrowed direction (FIG. 11) by means of the chains 77 and 87 and the clutch 85. In doing this, the driving force of the motor 73 is transmitted to the upper belt 94 through the gears 97 and 98. Thus, the stack of notes ($M_2$) held between the lower and upper belts 71 and 94 are quickly delivered to the outlet 8 via the space 99. FIG. 11 shows an operating state at this point of time. As shown in FIG. 11, the stack of notes ($M_3$) discharged from the space 99 have their forward edges exposed to the outside through the outlet 8.

Thereafter, when the sensing element 105 finds that no bank notes ($M_2$) remain at the temporary collecting section 65, it causes the clutch 85 to be released. By this, the notes cease to be further forced out, and are kept in the discharged state where their backward edges are softly held between the lower and upper belts 71 and 94. Thus, the customer may receive the notes ($M_3$) by only seizing the forward edges of the notes ($M_3$) projecting from the casing 1 and pulling the notes out.

Figure 12:
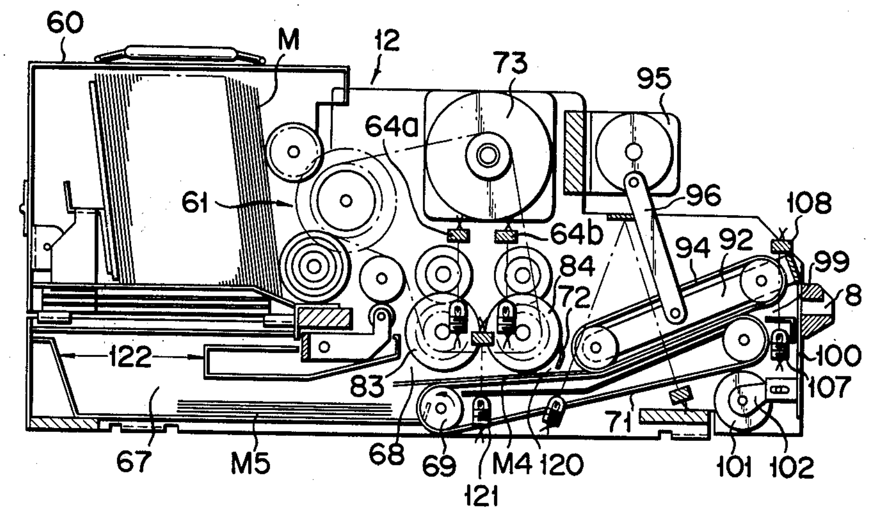
Figure 13:
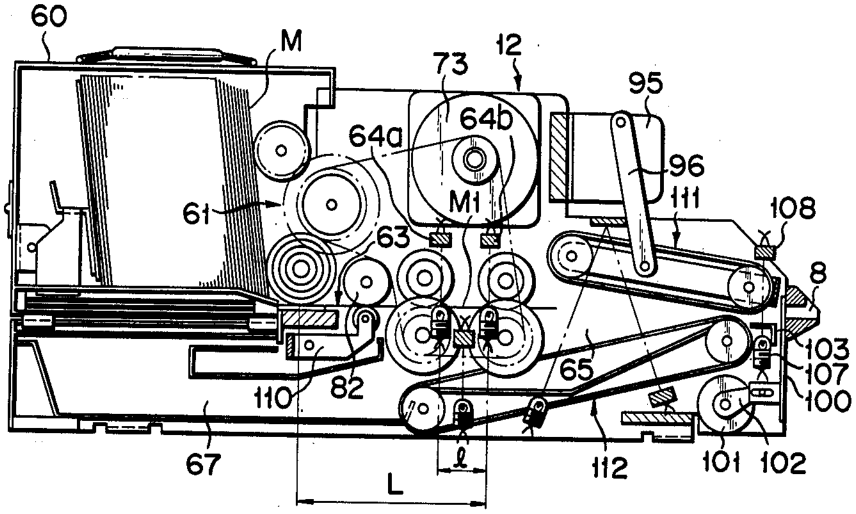

When the notes are pulled out, it is detected by the sensing element 108, and the platelike shutter 100 is raised by the combined operation of the rotary solenoid 101 and the arm 102 to disconnect the outlet 8 from the space 99, as shown in FIG. 12. Moreover, the swing member 92 is pulled up by the combined action of the motor 95 and the crank mechanism 96 to its initial position where it waits for the bank notes (M) taken out from the safe 60 to reach the temporary collecting section 65 (FIG. 13).

Figure 10:
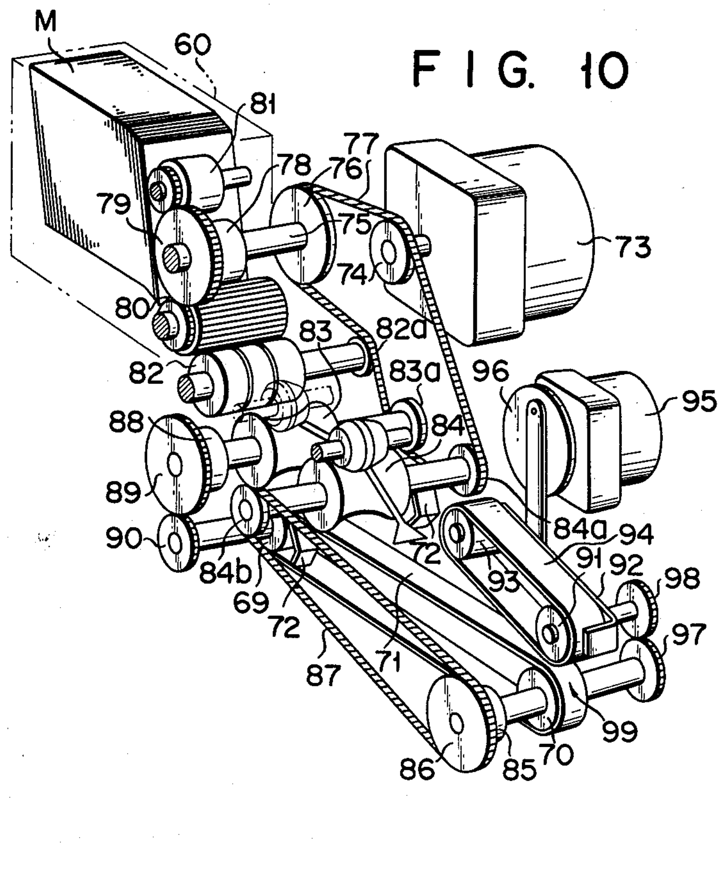
FIG. 10 is a perspective view of the payment unit.

If there are caused any malfunctions of the takeout mechanism 61 such as multiple takeout or wrong operations of the counters 64*a* and 64*b* such as counting errors, the swing member 92 is forced down by the action of the motor 95 and the crank mechanism 96, and bank notes ($M_4$) are held between the lower and upper belts 71 and 94 in the same manner as the discharging operation, as shown in FIG. 12. In this case, the top-side belt portion of the lower belt 71, which is an elastic belt, is curved downward when it is pressed by the upper belt 94. By this, there may be formed, between the stopper 72 and the top-side belt portion of the lower belt 71 carrying the notes, a gap 120 (FIG. 12) which is wide enough to admit the maximum amount of collected notes. Then, the main motor 73 is rotated, the clutches 85 and 88 are released and thrown in respectively, and the recovery-side roller 69 is reversed in the arrowed direction (FIG. 12) through the gears 89 and 90 (FIG. 10). Since the driving rollers of the conveyer system 63 are rotated in the same direction for the takeout of the notches from the safe 60, the notes moved toward the recovery opening 68 by the movements of the lower and upper belts 71 and 94 are passed through the gap 120 under the stopper 72, held between the bottom-side portions of the driving rollers 83 and 84 of the conveyer system 63 and the top-side belt portion of the lower belt 71, fed toward the recovery opening 68, and collected in the recovery box 67 through the recovery opening 68. The completion of the recovery of the notes is detected by a detector means 121 (FIG. 12) consisting of a light source and a sensing element. Since the recovery box 67 is located right under the safe 60, bank notes ($M_5$) collected in the recovery box 67 may be taken out through a top edge 122 of the recovery box 67 which can be opened wide by removing the safe 60 from the payment unit.

Thus, although reduced in both size and weight, the payment unit 12 may exhibit high performance, hardly suffering any troubles such as jam. Since the slip outlet 7 and card inlet/outlet 4 of the slip issuing apparatus 11 and the cash outlet 8 of the payment unit 12 are arranged on the same surface or the vertical front surface A of the mechanical section 1 of FIG. 2, the user of the automatic dispensing machine can handle all his desired medium on the same plane. Moreover, the slip outlet 7 is disposed in close vicinity to the card inlet/outlet 4, the user can catch both the card and the slip at once.

Referring now to the drawings of FIGS. 13 and 14, there will be described the detection control of the payment unit 12 for the takeout of the bank notes.

In FIG. 13, when the notes (M) are taken out of the safe 60 by means of the takeout mechanism 61 as described before, they are fed to the temporary collecting section 65 by the conveyer system 63. In the conveyer system 63 are a thickness sensor 110 to detect the thickness of the notes which is composed of a pickup roller in contact with the basic roller 82, and the first and second detectors 64*a* and 64*b* each composed of a light source and a sensing element.

Figure 14:
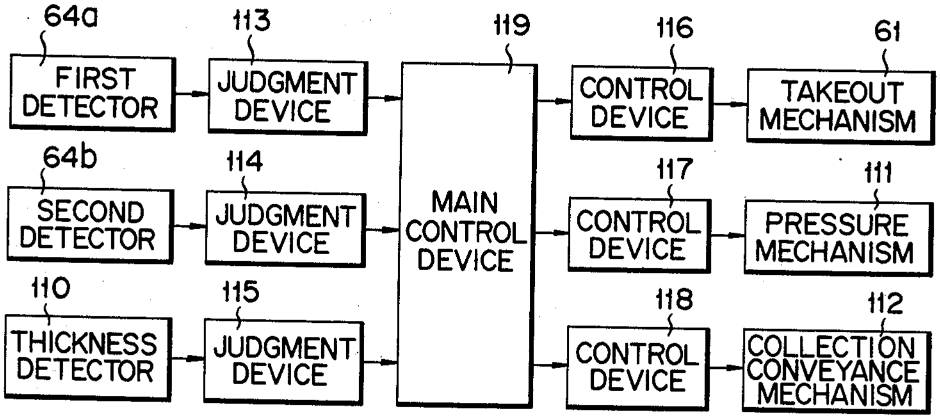
FIG. 14 is a control block diagram of a detection mechanism.

FIG. 14 shows the construction of a control system for controlling the mechanisms by means of the aforesaid detectors. As shown in FIG. 14, the respective outputs of the first detector 64*a*, second detector 64*b* and thickness sensor 110 are supplied to their corresponding judgement devices 113, 114 and 115 in the electric control section 2, the outputs of which are supplied to a main control device 119.

The first detector 64*a* and its corresponding judgement device 113 detect the takeout of the bank notes (M) by the takeout mechanism 61 through the forward edges of the notes, and the takeout control device 116 controls the takeout mechanism 61 through the main control device 119 in the electric control section 2, thereby stopping the takeout operation. Namely, the clutch 78 for takeout of FIG. 10 is disengaged. The first detector 64*a* is located in a position where the notes (M) are subject to full carrying power of the conveyer system 63. After the takeout operation is stopped, the bank notes are pulled out all together from the safe 60 by the conveyer system 63.

The second detector 64*b* is located at a fixed distance (l) from the first detector 64*a*. The output of the second detector 64*b* is supplied to the main control device 119 via the judgement device 114. The main control device 119 divides the time required for the passage of one note through the second detector 64*a* by the transit time to cover the distance (l), and compares the resultant quotient with a specific constant. This is done for the purpose of detecting mixing in of paper other than bank notes or bank notes of different sizes. Further, the quotient is compared in order to minimize the effect of unevenness in speed fluctuations. At the same time, the second detector 64*b* can detect conveyance errors, i.e. one-time carrying of two or more overlapping notes through the quantity of output signals.

The thickness sensor 110 and its corresponding judgement device 115 detect multiple takeout by comparing the thickness of notes held between the basic roller 82 and the pickup roller of the sensor 110 with the thickness level of one note, and supplies a detection signal to the main control device 119. In doing this, the first detector 64*a* times the start of the thickness detection, while the second detector 64*b* times the end of the detection.

If all those judgement devices 113, 114 and 115 determine the absence of any misoperation, then the main control device 119 supplies a signal to that effect to the takeout control device 116. At this time, the immediately following takeout operation starts. By repeating these operations, a correct and accurate specified number of notes can be taken out. If any of the judgement devices 113, 114 and 115 tells abnormality, on the other hand, the main control device 119, supplied with a signal to that effect, will stop the takeout operation through the takeout control device 116 and drive a collected-note presser mechanism 111 including the upper belt 94 and the crank mechanism 96 through a collection-note presser control device 117. Further, in a collection/conveyance control device 118, the clutch 85 for collection and discharge is disengaged and the clutch 88 for recovery is thrown in, as shown in FIG. 10, to recover the notes from the temporary collecting section 65 to the recovery box 67, and the takeout operation is resumed after ensuring that all the five optical detectors as shown in FIG. 9 are lighted. In FIG. 14, a collection/conveyance mechanism 112 includes the lower belt 71 driven by the collection/conveyance control device 118 and parts related thereto.

According to the above-mentioned method, the detectors 64*a*, 64*b* and 110 may be arranged within a distance (L) that is shorter than the length of a note, as shown in FIG. 13, which is a primary factor in the reduction of the automatic cash dispensing machine of this invention in size and weight.

Figure 15:
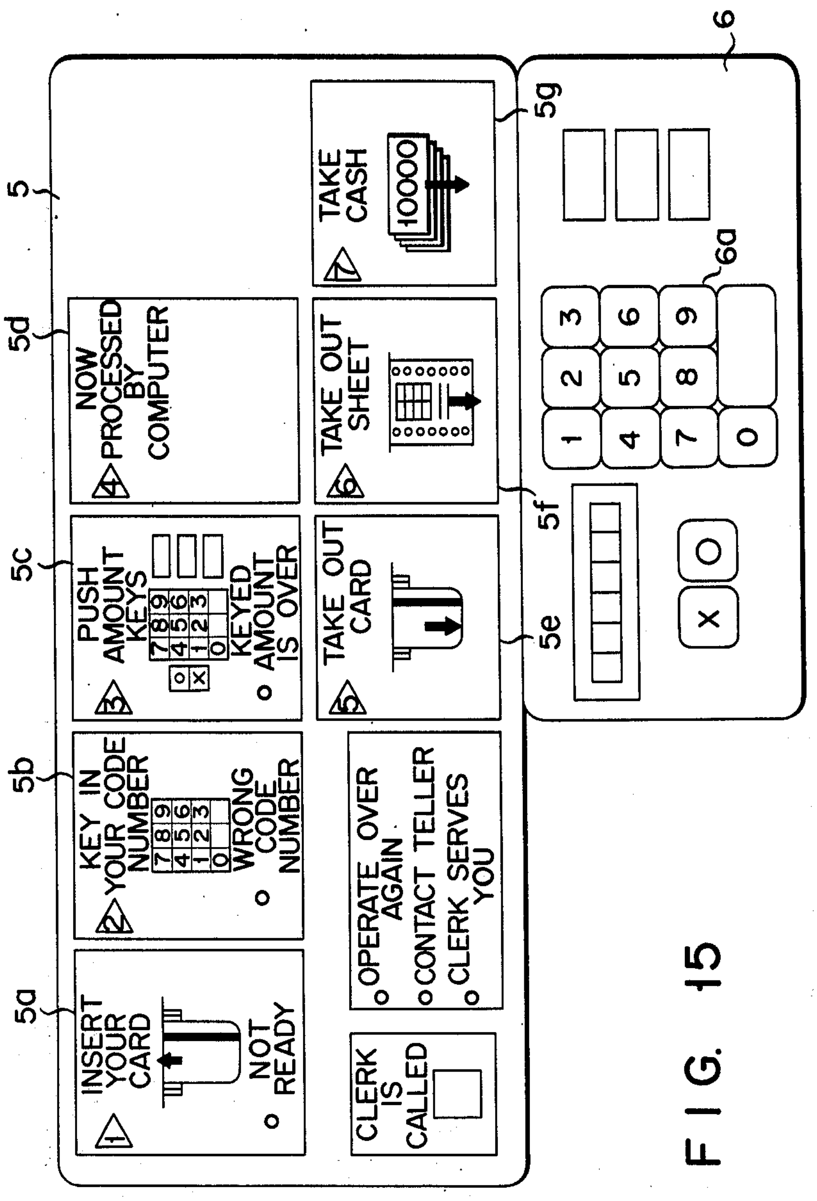
FIG. 15 is an enlarged plan showing an operation guide display and a keyboard operation unit.

Referring now to FIG. 15, there will further be described the construction in the horizontal top surface B of the dispensing machine as a panel for customers' operations.

FIG. 15 shows the details of the operation guide display 5 and the keyboard 6. Numerals 5*a* to 5*g* designate sections bearing their respective directive phrases. Each section is provided with a triangular lamp as an indicator means, a directive phrase beside the lamp, a directive illustration related to the directive phrase, such as a schematic view of an ID card, a round lamp, and a directive phrase beside the round lamp. The directive phrases accompanying the triangular indicating lamps are instructions for normal operations to be performed by the customer. The customer is guided successively to the currently required steps of operation by successive on-off operations of these triangular lamps. The secondary directive phrase beside each round indicating lamp is an auxiliary notice to inform the user that he is mistaken in operation. If a wrong operation is caused, the round lamp in the section concerned flickers, thereby inducing the customer to read the auxiliary phrase annexed thereto.

If the triangular lamp in the section 5*b* flickers, for example, the section 5*b* is brought into a first indication state to direct the customer to input his code number. Then, the customer can understand at once from the illustration that he is expected to key in his code number by means of a ten-key 6*a* on the operation keyboard 6. If a control device (not shown) gives a judgement that the customer has inputted a wrong number, then the triangular lamp in the section 5*b* will go out, and the round lamp in the same section will flicker, thereby directing the customer to repeat the inputting with the correct code number. When the operation for the section 5*b* is accomplished, the triangular lamp in the section 5*b* continues to be on second indication state, thereby notifying the customer of the completion of the operations up to the section or step 5*b*. When all the steps of operation are completed to achieve the payment, all the indicating lamps in the display 5 go out.

Thereupon, the directive phrases are arranged in the order of the operating steps of the machine.

Besides, further indications are provided in the lower left hand corner of the frame of the operation guide display 5, while various necessary keys, as well as the ten-key 6*a*, are arranged on the keyboard 6.

As positively shown in FIG. 5, the keyboard 6 and the display 5 for displaying the instructions for operations on the keyboard 6, in the dispensing machine of this invention, are disposed not on the vertical front surface in which the card inlet/outlet 4, cash outlet 8 and slip outlet 7 are formed, but on the horizontal top surface somewhat ascendingly extending backward from the top edge of the front surface, so that the customer may find it very easy to operate the keyboard 6 from above.

Electric wiring 130 covering from the display 5 to the keyboard 6 is so arranged as not to affect the internal mechanisms, extending along the uppermost regions of the interior of the mechanical section to the external connector 3.

Thus, the display 5 can be flattened to a high degree by applying the lamp indication system thereto. This is one of the factors conductive to the reduction of the mechanical section 1 in height.

According to this invention, as described above, there may be provided an automatic cash dispensing machine capable of highly compact design, setting in a relatively narrow optional place, and easy packing for transportation without detracting from the facility for the customers' use, to meet the needs of the times.

What is claimed is:

1. An automatic cash dispensing machine delivering a specified amount of bank notes to a customer in accordance with the customer's operations, comprising:

(a) a casing having a substantially vertical front surface and a substantially horizontal top surface extending backward from the top edge of said front surface;

(b) an operation unit on said horizontal top surface of said casing for designating the amount to be paid, and a guide display unit for displaying instructions for the operations on said operation unit;

(c) inlet means in said vertical front surface of said casing into which an identification medium is to be inserted;

(d) cash outlet means in said vertical front surface of said casing through which cash is discharged; and (e) a payment mechanism for delivering through said outlet means an amount of bank notes designated by means of said operation unit out of a stack of bank notes previously stored in said dispensing machine.

2. An automatic cash dispensing machine according to claim 1, wherein said guide display unit is composed of a plurality of sections arranged side by side and each bearing a specific directive phrase for the customer's guidance, and a plurality of indicator means successively indicating said sections in response to operations performed by the customer and guiding the customer into each subsequent proper step of operation.

3. An automatic cash dispensing machine according to claim 2, wherein at least some of the indicator means providing respectively for said sections exhibit a first indication state to direct the customer to perform an operation and a second indication state to inform the customer that a normal operation has been accomplished.

4. An automatic cash dispensing machine according to claim 2 or 3, wherein at least some of said sections are provided with an auxiliary phrase to the effect that an operation for each section concerned has been performed wrongly by the customer and an auxiliary indicator means to induce the customer to notice said auxiliary phrase in case of such wrong operation.

5. An automatic cash dispensing machine delivering a specified amount of bank notes to a customer in accordance with the customer's operations, comprising:

(a) a first console having a substantially vertical front surface and a substantially horizontal top surface, said first console including:

(1) an operation unit on said horizontaol top surface for designating the amount to be paid;

(2) a guide display unit on said horizontal top surface for displaying instructions for the operations on said operation unit;

(3) an inlet in said vertical front surface into which an identification medium is to be inserted;

(4) a cash outlet in said vertical front surface thrugh which cash is discharged; and (5) a payment mechanism for delivering through said outlet an amount of money designated by means of said control unit out of a stack of bank notes previously stored in said first console;

(b) a second console separable from said first console, said second console including a control unit for applying electric control signals to said operation unit, guide display unit and payment mechanism of said first console; and (c) means for electrically connecting said first and second consoles.

6. An automatic cash dispensing machine delivering a specified amount of bank notes to a customer in accordance with the customer's operations, comprising:

(a) a casing having a substantially vertical front surface and a substantially horizontal top surface extending backward from the top edge of said front surface;

(b) a keyboard operation unit on said horizontal top surface of said casing for designating the amount to be paid;

(c) a guide display unit disposed side by side with said operation unit on said horizontal top surface of said casing and successively giving the customer instructions for the operations on said operation unit;

(d) a recording mechanism having an inlet into which an identification medium is to be inserted, whereby contents or details in said identification medium are read and recorded, said inlet being disposed in said vertical front surface of said casing;

(e) a payment mechanism having a cash outlet through which an amount of money designated by means of said operation unit is discharged, whereby the specified amount of bank notes out of a stack of bank notes previously stored in said dispensing machine is discharged through said cash outlet, said outlet being disposed in said vertical front surface of said casing; and (f) a slip issuing mechanism having a slip outlet through which a receipt slip bearing details related to the amount paid is discharged, said slip outlet being disposed in said vertical front surface of said casing.

* * * * *